(12) United States Patent
Kale et al.

(10) Patent No.: US 10,510,021 B1
(45) Date of Patent: Dec. 17, 2019

(54) SYSTEMS AND METHODS FOR EVALUATING A LOSS FUNCTION OR A GRADIENT OF A LOSS FUNCTION VIA DUAL DECOMPOSITION

(71) Applicant: Google LLC, Mountain View, CA (US)

(72) Inventors: Satyen Chandrakant Kale, New York, NY (US); Daniel Holtmann-Rice, New York, NY (US); Sanjiv Kumar, Jericho, NY (US); Enxu Yan, Washington, DC (US); Xinnan Yu, Forest Hills, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/434,627

(22) Filed: Jun. 7, 2019

Related U.S. Application Data

(60) Provisional application No. 62/682,100, filed on Jun. 7, 2018.

(51) Int. Cl.
*G06N 20/00* (2019.01)
*G06F 17/17* (2006.01)
(52) U.S. Cl.
CPC ............ *G06N 20/00* (2019.01); *G06F 17/17* (2013.01)
(58) Field of Classification Search
CPC ........ G06N 20/00; G06N 20/10; G06N 20/20; G06F 17/17
See application file for complete search history.

(56) References Cited

U.S. PATENT DOCUMENTS

2012/0331025 A1* 12/2012 Gemulla ............... G06F 15/781
708/200

OTHER PUBLICATIONS

Yen, Ian. "Indexed Block Coordinate Descent for Large-Scale Linear Classification with Limited Memory." In Proceedings of the 19th ACM SIGKDD International Conference on Knowledge Discovery and Data Mining, pp. 248-256. ACM, 2013. (Year: 2013).*
Auvolat et al., "Clustering is Efficient for Approximate Maximum Inner Product Search", arXiv:1507.05910v3, Nov. 30, 2015, 10 pages.
Bhatia et al., "Sparse Local Embeddings for Extreme Multi-Label Classification", Conference on Neural Information Processing Systems, Dec. 7-12, 2015, Montreal,Canada, 9 pages.

(Continued)

*Primary Examiner* — Miranda M Huang
*Assistant Examiner* — Joseph V Nguyen
(74) *Attorney, Agent, or Firm* — Dority & Manning, P.A.

(57) ABSTRACT

Systems and methods for evaluating a loss function or a gradient of the loss function. In one example embodiment, a computer-implemented method includes partitioning a weight matrix into a plurality of blocks. The method includes identifying a first set of labels for each of the plurality of blocks with a score greater than a first threshold value. The method includes constructing a sparse approximation of a scoring vector for each of the plurality of blocks based on the first set of labels. The method includes determining a correction value for each sparse approximation of the scoring vector. The method includes determining an approximation of a loss or a gradient of a loss associated with the scoring function based on each sparse approximation of the scoring vector and the correction value associated with the sparse approximation of the scoring vector.

20 Claims, 5 Drawing Sheets

(56) References Cited

OTHER PUBLICATIONS

Boyd et al., "Distributed Optimization and Statistical Learning via the Alternating Direction Method of Multipliers", Foundations and Trends in Machine Learning, vol. 3, No. 1, 2011, 125 pages.
Chen et al., "Strategies for Training Large Vocabulary Neural Language Models", arXiv:1512.04906v1, Dec. 15, 2015, 13 pages.
Goldberger et al., "Neighbourhood Components Analysis", Advances in Neural Information Processing Systems, Dec. 13-18, 2004, Vancouver, British Columbia, 8 pages.
Guo et al., "Quantization Based Fast Inner Product Search", Conference on Artificial Intelligence and Statistics, May 9-11, 2016, Cadiz, Spain, pp. 482-490.
Gutmann et al., "Noise Contrastive Estimation of Unnormalized Statistical Models, with Applications to Natural Image Statistics", Journal of Machine Learning Research, vol. 13, Feb. 12, 2012, pp. 307-361.
Jean et al., "On Using Very Large Target Vocabulary for Neural Machine Translation", arXiv:1412.2007v1, Dec. 5, 2014, 10 pages.
Li et al., "Fast K-Nearest Neighbour Search via Prioritized DCI", arXiv:1703.00440v2, Jul. 20, 2017, 14 pages.
Mikolov et al., "Distributed Representations of Words and Phrases and Their Compositionality", Conference on Neural Information Processing Systems, Dec. 5-10, 2013, Lake Tahoe, Nevada, 9 pages.
Mnih et al., "A Scalable Hierarchical Distributed Language Model", Conference on Neural Information Processing Systems, Dec. 6-11, 2009, Vancouver, British Columbia, 8 pages.
Morin et al., "Hierarchical Probabilistic Neural Network Language Model", Conference on Artificial Intelligence and Statistics, Apr. 16-18, 2009, Clearwater Beach, Florida, 7 pages.
Movshovitz-Attias et al., "No Fuss Distance Metric Learning Using Proxies", arXiv:1703.07464v3, Aug. 1, 2017, 9 pages.
Mussmann et al., "Learning and Inference via Maximum Inner Product Search", International Conference on Machine Learning, Jun. 19-24, 2016, New York, New York, 13 pages.
Mussmann et al., "Fast Amortized Inference and Learning in Log-Linear Models with Randomly Perturbed Nearest Neighbor Search", arXiv:1707.03372v1, Jul. 11, 2017, 15 pages.
Partalas et al., "LSHTC: A Benchmark for Large-Scale Text Classification", arXiv:1503.08581v1, Mar. 30, 2015, 9 pages.
Prabhu et al., "FastXML: A Fast, Accurate and Stable Tree-Classifier for Extreme Multi-Label Learning", International Conference on Knowledge, Discovery and Data Mining, Aug. 24-27, 2004, New York, New York, 10 pages.
Schroff et al., "Facenet: A Unified Embedding for Face Recognition and Clustering", arXiv:1503.03832v3, Jun. 17, 2015, 10 pages.
Shrivastava et al., "Asymmetric LSH (ALSH) for Sublinear Time Maximum Inner Product Search (MIPS)", arXiv:1405.5869v1, May 22, 2014, 19 pages.
Spring et al., "New Unbiased and Efficient Class of LSH-Based Samplers and Estimators for Partition Function Computation in Log-Linear Models", arXiv:1703.05160v1, Mar. 15, 2017, 10 pages.
Spring et al., "Scalable and Sustainable Deep Learning via Randomized Hashing", International Conference on Knowledge, Discovery and Data Mining, Aug. 13-17, 2017, Halifax, Canada, 10 pages.
Vijayanarasimhan et al., "Deep Networks with Large Output Spaces", arXiv:1412.7479v2, Dec. 29, 2014, 9 pages.
Weinberger et al., "Distance Metric Learning for Large Margin Nearest Neighbor Classification", Journal of Machine Learning Research, vol. 10, Feb. 9, 2009, 38 pages.
Wu et al., "Multiscale Quantization for Fast Similarity Search", Conference on Neural Information Processing Systems, Dec. 4-9, 2017, Long Beach, California, 11 pages.
Yen et al., "PPDsparse: A Parallel Primal-Dual Sparse Method for Extreme Classification", International Conference on Knowledge Discovery and Data Mining, Aug. 13-17, 2017, 9 pages.
Yen et al., "Indexed Block Coordinate Descent for Large-Scale Linear Classification with Limited Memory", International Conference on Knowledge, Discovery and Data Mining, Aug. 11-14, 2013, pp. 248-256.
Yen et al., "PD-Sparse: A Primal and Dual Sparse Approach to Extreme Multiclass and Multilabel Classification", International Conference on Machine Learning, Jun. 19-24, 2016, New York, New York, 9 pages.
Yu et al., "Large-Scale Multi-Label Learning with Missing Labels", International Conference on Machine Learning, Jun. 21-26, 2014, Beijing, China, 9 pages.
International Search Report and Written Opinion for PCT/US2019/036057, dated Sep. 6, 2019, 10 pages.
Ranjbar et al., "Complex Loss Optimization via Dual Decomposition", IEEE 2012 Conference on Computer Vision and Pattern Recognition, Jun. 16, 2012, pp. 2304-2311.
Yen et al., "Dual Decomposed Learning with Factorwise Oracles for Structural SVMs of Large Output Domain", Advances in Neural Information Processing Systems, vol. 29, Dec. 2016, pp. 5030-5038,XP055616313, 10 pages.
Yen et al., "Loss Decomposition for Fast Learning in Large Output Spaces", Proceedings of the 35th International Conference on Machine Learning, Jul. 10-15, 2018, Stockholm, Sweden, Jul. 10, 2018, XP055616044, 10 pages.
Yen, Ian, "Sublinear-Time Optimization for High-Dimensional Learning", Poster for Thesis Proposal Presentation, Machine Learning Department, Carnegie Mellon University, Nov. 30, 2017, http://www.cs.cmu.edu/afs/.cs.cmu.edu/Web/Posters/MLProposal-IeHYen17.11f, dated Aug. 30, 2019, 1 page.
Yen, Ian, "Sublinear-Time Optimization for High-Dimensional Learning", Thesis Proposal, Machine Learning Department, Carnegie Mellon University, Nov. 2017, XP055616323, https://podfs.semanticscholar.org/29e2/d13358bacdb384c59c4acal5a9ea7b8b4685.podf, dated Aug. 28, 2019, 36 pages.

* cited by examiner

SYSTEMS AND METHODS FOR EVALUATING A LOSS FUNCTION OR A GRADIENT OF A LOSS FUNCTION VIA DUAL DECOMPOSITION

PRIORITY CLAIM

The present application claims the benefit of priority of U.S. Provisional Patent Application No. 62/682,100 filed Jun. 7, 2018, entitled "Systems and Methods for Evaluating a Loss Function or a Gradient of a Loss Function via Dual Decomposition." The above-referenced patent application is incorporated herein by reference.

FIELD

The present disclosure relates generally to evaluating a loss function or a gradient of a loss function. More particularly, the present disclosure relates to computer systems and methods that efficiently evaluate a loss function and/or its gradient for problems with large output spaces via dual decomposition of the loss function.

BACKGROUND

Large output spaces are ubiquitous in several machine learning problems today. Such machine learning problems can include, for example, extreme multiclass or multilabel classification problems with many classes, language modeling with big vocabularies, or metric learning with a large number of pairwise distance constraints. In all such problems, a key bottleneck in training models is the evaluation of a loss function and its gradient. The loss functions used for such problems typically require an enumeration of all the possible outputs, and can require a linear running time in the number of outputs for evaluation. This can be a significant bottleneck in iterative methods such as gradient descent used to train the model, since each step can require a huge number of operations.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for evaluating a loss function or a gradient of the loss function. The method includes partitioning, by a computing system that includes one or more computing devices, a weight matrix into a plurality of blocks, the weight matrix corresponding to a scoring function. The method includes identifying, by the computing system, a first set of labels for each of the plurality of blocks, the first set of labels being associated with a score greater than a first threshold value. The method includes constructing, by the computing system, a sparse approximation of a scoring vector for each of the plurality of blocks based at least in part on the first set of labels. The method includes determining, by the computing system, a correction value for each sparse approximation of the scoring vector for each of the plurality of blocks. The method includes determining, by the computing system, an approximation of a loss or a gradient of a loss associated with the scoring function by evaluating a decomposed loss function or a gradient of the decomposed loss function based at least in part on the sparse approximation of the scoring vector for each of the plurality of blocks and the correction value associated with the sparse approximation of the scoring vector.

The computing system may determine the approximation of the loss or the gradient of the loss for each of a plurality of training examples.

The computing system may modify one or more parameters of the weight matrix or the scoring function based at least in part on the determined approximation of the loss or the gradient of the loss associated with the scoring function.

Identifying the first set of labels for each of the plurality of blocks may comprises querying, by the computing system, each of a plurality of maximum inner product search data structures that are respectively associated with the plurality of blocks of the weight matrix.

Constructing the sparse approximation of the scoring vector for each of the plurality of blocks may comprise setting for each of the plurality of blocks, by the computing system, a respective approximate score for each of the plurality of labels that was neither included in the first set of labels for the block nor a positive label equal to zero.

Constructing the sparse approximation of the scoring vector for each of the plurality of blocks may comprises setting for each of the plurality of blocks, by the computing system, a respective approximate score for each of the plurality of labels that was neither included in the first set of labels for the block nor a positive label equal to a true score determined according to a maximum inner search product search query.

Determining the correction value for each sparse approximation of the scoring vector for each of the plurality of blocks may comprise identifying, by the computing system, a second set of labels based at least in part on the first set of labels for each of the plurality of blocks, the second set of labels being associated with a gradient greater than a second threshold value; determining, by the computing system, an average approximate score for each label in the second set of labels across the plurality of blocks; determining, by the computing system, an approximate score for each label in the second set of labels for each of the plurality of blocks; determining, by the computing system, a difference between the average approximate score and the approximate score for each of the plurality of blocks for each combination of a label in the second set of labels and a block in the plurality of blocks; and updating, by the computing system, the correction value for each sparse approximation of the scoring vector for each of the plurality of blocks based at least in part on the determined difference for each combination of a label in the second set of labels and a block in the plurality of blocks.

Determining an approximation of a loss or a gradient of a loss associated with the scoring function may comprise minimizing an average, by the computing system, across the plurality of blocks, of a respective loss for each block evaluated at the respective approximated scoring vector for such block plus a correction value vector for each block such that a sum of the correction value vectors across the plurality of blocks is equal to zero.

The decomposed loss function may comprise a plurality of parts, each part corresponding to loss associated with a respective sparse approximation of the scoring vector for each of the plurality of blocks.

The computing system may perform a smoothing technique on a loss function to construct a surrogate loss function that has continuous gradients; and determine the decomposed loss function based at least in part on the surrogate loss function.

Each of the plurality of blocks may comprise one or more columns of the weight matrix.

Querying each of the plurality of maximum inner product search data structures that are respectively associated with the plurality of blocks of the weight matrix may comprise: obtaining, by the computing system, a feature map corresponding to the weight matrix and the scoring function; partitioning, by the computing system, the feature map into a plurality of blocks corresponding to the plurality of blocks of the weight matrix; and querying, by the computing system, each of the plurality of maximum inner product search data structures that are respectively associated with the plurality of blocks of the weight matrix with an output of the partitioned feature map corresponding to the block of the weight matrix and the first threshold value.

Another example aspect of the present disclosure is directed to a computer system. The computer system includes one or more processors, and one or more non-transitory computer-readable media that, when executed by the one or more processors, cause the computer system to carry out the method described above.

Another example aspect of the present disclosure is directed to a computer system. The computer system includes one or more processors, and one or more non-transitory computer-readable media that, when executed by the one or more processors, cause the computer system to perform operations. The operations include identifying, for each of a plurality of block partitions of a weight matrix, a first subset of a plurality of labels that has a score greater than a first threshold value. The operations include constructing, for each of the plurality of block partition, a sparse approximation of a scoring vector for such block partition based at least in part on the first subset of the plurality of labels identified for such block partition. The operations include iteratively optimizing a decomposed loss function by updating a correction value for at least some of the plurality of labels via one or more iterations. The operations include, after iteratively optimizing the decomposed loss function, returning an evaluation of the decomposed loss function or a gradient of the decomposed loss function.

Another example aspect of the present disclosure is directed to a computer-implemented method of training a classifier. The method comprises training the classifier using a loss function or a gradient of the loss function obtained from the method described above. For example an approximation of the loss function, and/or gradient may be obtained using the method above when training the classifier. The classifier may be configured for use in extreme multiclass or multilabel classification problems. The classifier may provide classification of any suitable data items.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles. Optional features of one aspect may be combined with other aspects where appropriate.

BRIEF DESCRIPTION OF THE DRAWINGS

Detailed discussion of embodiments directed to one of ordinary skill in the art is set forth in the specification, which makes reference to the appended figures, in which.

Figure 1:
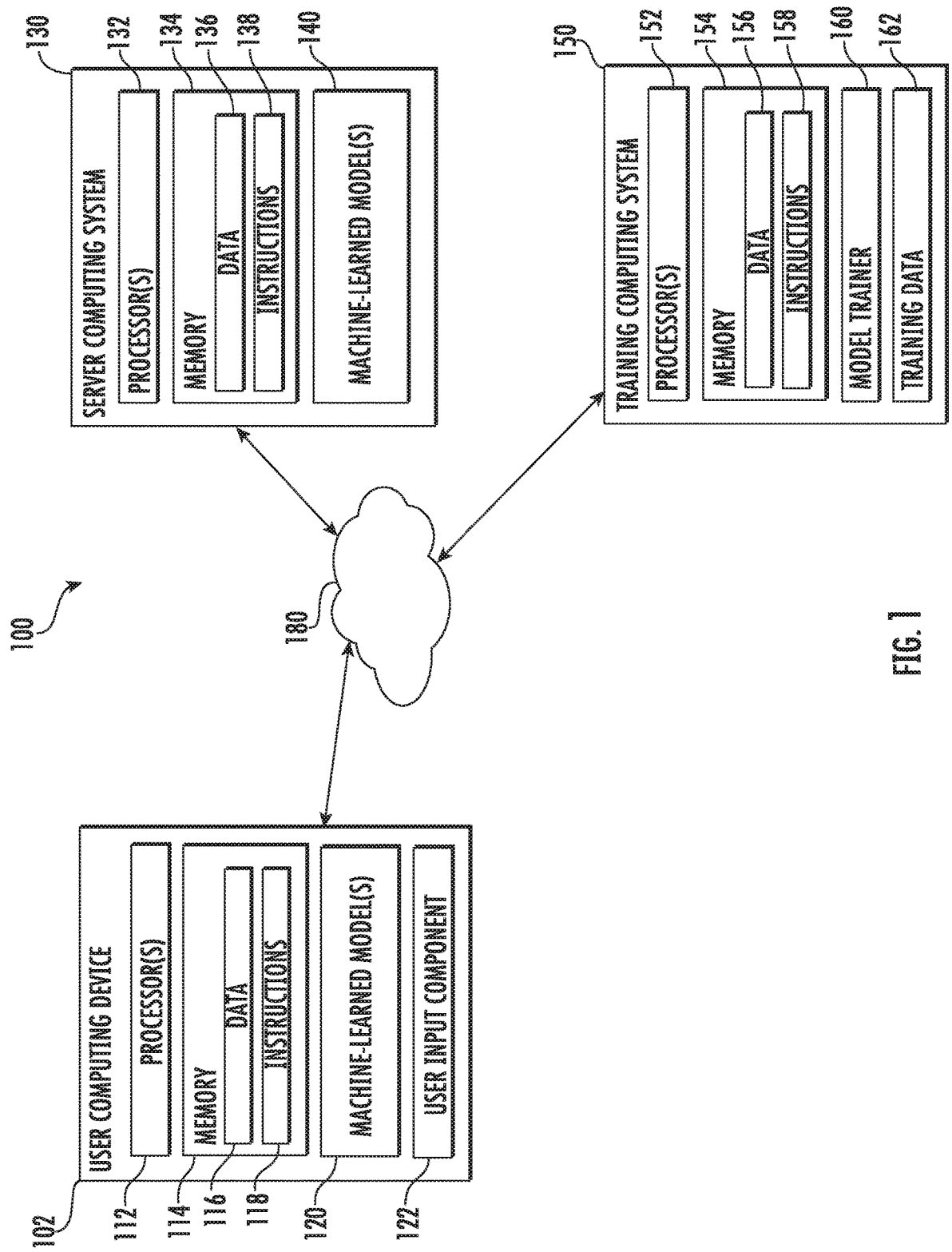
FIG. 1 depicts a block diagram of an example computing device, in accordance with some implementations of the present disclosure.

Reference numerals that are repeated across plural figures are intended to identify the same components or features in various implementations.

DETAILED DESCRIPTION

Generally, the present disclosure is directed to systems and methods for evaluating a loss function or a gradient of a loss function. For problems with large output spaces, evaluating a loss function and its gradient can be computationally expensive, typically taking linear time in the size of the output space. Recently, methods have been developed to speed up learning via efficient data structures for Nearest-Neighbor Search (NNS) or Maximum Inner-Product Search (MIPS). However, the performance of such data structures typically degrades in high dimensions. The present disclosure provides systems and methods that reduce an intractable high dimensional search problem to several much more tractable lower dimensional ones via dual decomposition of a loss function. The present disclosure further provides a greedy message passing technique that guarantees convergence to an original loss. In this way, the systems and methods of the present disclosure can improve the accuracy of search-based gradient approximation methods and outperform sampling-based gradient approximation methods by a large margin. In particular, aspects of the present disclosure provide a method which is particularly adapted to the internal functioning of one or more computers.

Many approaches have been proposed to mitigate the evaluation of a loss function and its gradient as a bottleneck in training models for machine learning problems with large output spaces. One body of work imposes structure over the output space. The structure can include, for example, a low-rank structure, tree structure, locally low-rank structure, or hierarchical factorization structure. However, structural assumptions can be violated in many situations. For example, while the low-rank structure is typically reasonable in a recommendation problem, it is usually not true in multiclass classification as for each instance there is exactly one correct answer (i.e. classes may not be correlated with each other). Additionally, even for valid structural assumptions, constructing the correct structure from data is hard, and in practice heuristics or human annotation are required.

Another approach is sampling approximation, which computes an estimate of a gradient based on the scores of only a small fraction of the negative output classes and also a small set of classes labeled as positive. The approximation, however, has large variance when the loss has a skewed distribution over classes. For example, in extreme multiclass or multilabel classification, the loss typically only concentrates on a few confusing classes, which have small probabilities of being sampled. The variance in gradient estimation often leads to slow progress of the learning algorithm.

For machine learning problems with large output spaces, but with a relatively small set of correct outputs, the learning objective typically has its gradient concentrated on a relatively small number of classes, and therefore an efficient way to learn is to search for classes of significant gradient magnitude. A proposed strategy to search classes efficiently is to maintain a sparse model during training. However, this method applies only in problems of high input dimension. Another strategy is to utilize data structures to find classes efficiently through Maximum Inner Product Search (MIPS) or Nearest-Neighbor Search (NNS). The main challenge here is that as dimension grows, it becomes difficult to perform MIPS or NNS with both high recall and high precision, and therefore gradient approximation through MIPS or NNS often sacrifices accuracy to achieve efficiency.

Aspects of the present disclosure provide for an algorithm based on an application of dual decomposition to the convex-conjugate representation of a loss function. This can be viewed as a complementary technique for applying search data structures to a learning problem. The algorithm replaces the high dimensional search problem with several lower dimensional searches by decoupling the dimensions via dual decomposition. Lower dimensional search can be done much more efficiently, and the different searches are then coupled together via a greedy message passing algorithm. The greedy message passing algorithm is guaranteed to converge and thus can be used to obtain good approximations to a loss and its gradient.

The systems and methods described herein provide a number of technical effects and benefits. Systems and methods for enabling a technique to reduce a high dimensional search problem to several lower dimensional search problems can have a technical effect of improved efficiency by lowering a computational cost associated with the high dimensional search problem. For example, the high dimensional search problem can be solved by one or more processors in fewer cycles with a smaller memory requirement and/or the lower dimensional search problems can be distributed across several processors and solved in parallel thereby reducing a computational time associated with the high-dimensional search problem. Recently developed methods of using efficient data structures for Nearest-Neighbor Search (NNS) or Maximum Inner Product Search (MIPS) speed up learning, but the performance of such data structures degrades in high dimensions. The technique of the present disclosure improves the accuracy of search-based gradient approximation methods and outperforms sampling-based gradient approximation methods.

Additionally, systems and methods for enabling a greedy message passing technique can have a technical effect of guaranteeing convergence of an approximated loss to an original loss. The technique can enable decoupling variables into lower dimensional chunks that can be optimized separately and iteratively performing a greedy descent toward an optimal solution. Thus, the systems and methods of the present disclosure improve usage of processor or memory, especially parallel processing systems.

The systems and methods of the present disclosure also provide an improvement to computing technology, such as data matching and retrieval computing technology. For instance, the systems and methods herein enables the evaluation of a loss or a gradient of the loss to be carried out efficiently.

1. Problem Setup

According to aspects of the present disclosure, let $\mathcal{X}$ denote the input space and $\mathcal{Y}$ the output space, and let $K:=|\mathcal{Y}|$, where K is extremely large (e.g., on the order of hundreds of thousands or larger). A learning objective for a machine learning problem can include learning a scoring function $f: \mathcal{X} \to \mathbb{R}^K$ for a large output space $\mathcal{Y}$ from a given class of such functions, $\mathcal{F}$. Labeled samples are pairs $(x, \mathcal{P})$ with $x \in \mathcal{X}$ and $\mathcal{P} \subseteq \mathcal{Y}$ which denotes the set of correct labels for the input point x. The notation $\mathcal{N} := \mathcal{Y} \setminus \mathcal{P}$ can be used to denote the set of negative labels. Given a collection of training samples $\{(x_i, \mathcal{P}_i)\}_{i=1}^N$, the learning objective takes the following form:

$$\min_{f \in \mathcal{F}} \frac{1}{N} \sum_{i=1}^{N} L(f(x_i), \mathcal{P}_i),$$

where $L: \mathbb{R}^K \times 2^{\mathcal{Y}} \to \mathbb{R}$ is a loss function such that $L(z, \mathcal{P})$ penalizes the discrepancy between the score vector $z \in \mathbb{R}^K$ and a set of positive labels $P \subseteq \mathcal{Y}$. The evaluation of the loss function and its gradient with respect to the score vector, $\nabla_z L(z, \mathcal{P})$, typically has cost growing linearly with the size of the output space K, and thus is expensive for problems with huge output spaces.

In order to reduce the complexity of loss and gradient evaluation, a linear structural assumption can be imposed on the class of scoring functions $\mathcal{F}$: there is an embedding dimension parameter $D \in \mathbb{N}$ such that for every $f \in \mathcal{F}$, there is an associated weight matrix $W \in \mathbb{R}^{K \times D}$ and feature map $\phi: \mathcal{X} \to \mathbb{R}^D$ so that for all $x \in \mathcal{X}$, $$f(x) = W\phi(x), \tag{1}$$

where $D \ll K$ (e.g., on the order of a few hundreds or thousands), so that $\phi(x)$ can be explicitly evaluated.

Accordingly, given $f$ and a batch of samples $\{x_i, \mathcal{P}_i\}_{i=1}^N$, an approximation to the empirical loss $$\frac{1}{N} \sum_{i=1}^{N} L(f(x_i), \mathcal{P}_i)$$

and its gradient can be determined.

In order to determine good approximations to the loss $f(x_i, \mathcal{P}_i)$ and its gradient without computing the vector $f(x)$ entirely, data structures can be constructed that preprocess the matrix W. Given an appropriate data structure, such approximations can be computed in sublinear (in K) time.

A first example of a problem with a large output space that fits in the framework discussed above includes extreme classification. In extreme classification problems, popular classification loss functions include Cross-Entropy Loss $$L(z, \mathcal{P}) := \sum_{k \in \mathcal{P}} \log\left(\sum_{j=1}^{K} \exp(z_j)\right) - z_k \tag{2}$$

and Max-Margin Loss $$L(z, \mathcal{P}) := \left[\max_{k \in \mathcal{P}, j \in \mathcal{N}} z_k - z_j + 1\right]_+. \tag{3}$$

For multiclass problems, $|\mathcal{P}|=1$, while for multilabel problems usually $|\mathcal{P}|\ll K$. A typical scoring function takes the form $$f(x) := W\phi(x). \tag{4}$$

Here, $\phi(x)$ is a feature map constructed either from the domain knowledge or via learning (e.g., a neural network). Both of them fit the structural assumption (1).

A second example of a problem with a large output space that fits in the framework includes metric learning. In Metric Learning problems, a learning objecting during training includes learning a function $$f(x) = [-d(x,y)]_{y \in \mathcal{Y}}, \tag{5}$$

that denotes the dissimilarities of the point x to a collection of points $y \in \mathcal{Y}$. Common choices of the dissimilarity function include the squared Euclidean distance $d(x, y) = \|\psi(x) - \psi(y)\|_2^2$ parameterized by a nonlinear transformation $\psi: \mathcal{X} \to \mathbb{R}^d$ for some $d \in \mathbb{N}$, and, more generally, the squared Mahalanobis distance $d(x,y) = \psi(x) - \psi(y))^T M(\psi(x) - \psi(y))$ parameterized by $\psi$ and a positive definite matrix M. The candidate set $\mathcal{Y}$ could be the whole set of training samples $\{x_i\}_{i=1}^N$, or a collection of latent proxies $\{y_k\}_{k=1}^K$. For each sample $(x, \mathcal{P})$, the goal is to learn a distance function such that the positive candidates $\mathcal{P}$ are closer to x than the negative ones. Common loss functions for the task are Neighborhood Component Analysis (NCA) loss $$L(z, \mathcal{P}) := \sum_{k \in \mathcal{P}} \log\left(\sum_{j=1}^{K} \exp(z_j)\right) - z_k \tag{6}$$

and the Triplet loss $$L(z, \mathcal{P}) = \Sigma_{k \in \mathcal{P}} \Sigma_{j \in \mathcal{N}} [z_k - z_j + 1]_+. \tag{7}$$

Such scoring functions satisfy the structural assumption (1): for the scoring function $f$ given by the squared Mahalanobis distance parameterized by $\psi$ and M, the matrix W consists of the rows $<-\psi(y)^T M \psi(y), 2\psi(y)^T M, -1>$ for each $y \in \mathcal{Y}$, and $\phi(x) = <1, \psi(x)^T, \psi(x)^T M \psi(x)>^T$. Thus the embedding dimension D=d+2.

A third example of a problem with a large output space that fits in the framework includes word embeddings. In the standard word2vec training, the input space $\mathcal{X}$ is the vocabulary set, and the output space $\mathcal{Y} = \mathcal{X}$; thus K is the vocabulary size. The Skip-gram objective learns a scoring function $f$ of the following form:

$$f(x) = <\phi(y)^T \phi(x)>_{y \in \mathcal{X}}, \tag{8}$$

where $\phi(\cdot)$ is a latent word embedding. This clearly fits the structural assumption (1): the rows of the matrix W are the embeddings $\phi(y)$ for all $y \in \mathcal{X}$.

Then given a text corpus $\mathcal{D}$, the loss function for a sample $(x, \mathcal{P})$ where $\mathcal{P}$ is the set of words in the corpus appearing within a certain size window around the input word x, is given by $$L(z, P) = q_x \Sigma_{y \in \mathcal{P}} q_{y|x} \cdot [\log(\Sigma_{y' \in \mathcal{X}} \exp(z_{y'})) - z_y] \tag{9}$$

where $q_x$ is the empirical unigram frequency of x and $q_{y|x}$ is the empirical frequency of observing y within a window of x in the corpus $\mathcal{D}$.

1.1 Loss and Gradient Approximation Via Search

The loss functions considered in the above examples share a key feature: their value can be well approximated by the scores of the positive labels and the largest scores of the negative labels. Similarly, their gradients are dominated by the coordinates corresponding to the positive labels and the negative labels with the largest scores. For example, the Max-Margin loss (3) is completely determined by the largest score of the negative labels and the lowest scores of the positive labels, and its gradient is non-zero only on the negative label with largest score and the positive label with lowest score. Similarly, for the Cross-Entropy loss (2), the coordinates of the gradient corresponding to the negative classes are dominated by the ones with the highest score; the gradient coordinates decrease exponentially as the scores decrease.

According to an aspect of the present disclosure, since the score function $f$ satisfies the linear structural property (1), the largest scores can be computed efficiently via a Maximum Inner Product Search (MIPS) data structure. This data structure stores a large dataset of vectors $v_1, v_2, \ldots, v_K \in \mathbb{R}^D$ and supports queries of the following form: given a target vector $u \in \mathbb{R}^D$ and a threshold $\tau$, it returns the vectors $v_i$ stored in it that satisfy $|v_i^T u| \geq \tau$ in time that is typically sublinear in K. Thus, the matrix W can be preprocessed by storing the rows of W in an efficient MIPS data structure. Then for each sample x, the highest scores can be computed by querying this data structure with the target vector $\phi(x)$ and some reasonable threshold $\tau$, computing approximations to the loss and gradient from the returned vectors (and treating all other scores as 0). This method is depicted in Algorithm 1.

Algorithm 1 Loss and Gradient Approximation via Search input A sample $(x, \mathcal{P})$, accuracy parameter $\tau > 0$, and access to a MIPS data structure $\mathcal{T}$ for the rows of W.

output Approximations to $L(f(x), \mathcal{P}), \nabla L(f(x), \mathcal{P})$.

1: Query $\mathcal{T}$ with $\phi(x)$ and threshold $\tau$ to find $\mathcal{S} := \{k \| [f(x)]_k | > \tau\}$.

2: Construct a sparse approximation $\tilde{z}$ for $f(x)$ by setting $\tilde{z}_k = f(x)_k$ for $k \in \mathcal{S} \cup \mathcal{P}$, and $\tilde{z}_k = 0$ for $k \notin \mathcal{S} \cup \mathcal{P}$.

3: Return $L(\tilde{z}, \mathcal{P})$ and $\nabla L(z, \mathcal{P})$.

The error in this approximation is bounded by $\tau$ times the $l_\infty$ Lipschitz constant of $L(\cdot, \mathcal{P})$. For most loss functions considered, the $l_\infty$ Lipschitz constant is reasonably small: 2 for Max-Margin loss, $O(P_{max} \log(K))$ for Cross-Entropy loss (here, $P_{max}$ is the maximum number of positive labels for any example), etc.

The main difficulty in applying this approach in practice is the curse of dimensionality: the dependence on D is exponential for exact methods, and even for approximate methods, such as Locality-Sensitive Hashing, the cost still implicitly depends on the dimension as points become far apart when the intrinsic dimensionality is high.

The present disclosure enables a search technique based on dual decomposition to deal with the curse of dimensionality. This technique and its analysis are discussed further below.

In order to apply and analyze the technique, the loss functions needs to be smooth (e.g., have Lipschitz continuous gradients). For non-smooth losses like Max-Margin loss (3), a smoothing technique (e.g., Nesterov's smoothing technique) can be applied to construct a surrogate loss function with guaranteed approximation quality by adding a strongly convex term to the Fenchel conjugate of the loss:

$$L_\mu(z) := \max_\alpha \langle z, \alpha \rangle - \left(L^*(\alpha) + \frac{\mu}{2}\|\alpha\|^2\right). \tag{10}$$

Here, $\mu$ is a smoothing parameter that ensures that the surrogate loss has $$\frac{1}{\mu}$$

Lipschitz continuous gradients while approximating the original loss function to within $O(\mu)$. This Smoothed Max-Margin loss has gradient $$\nabla L(z) := proj_C\left(\frac{z + 1_N}{\mu}\right) \quad (11)$$

where $1_{\mathcal{N}}$ denotes a vector containing 0 for indices $k \in \mathcal{P}$ and 1 for $k \in \mathcal{N}$, and $proj_e(\cdot)$ denotes the projection onto the bi-simplex $\mathcal{C} = \{\alpha | \Sigma_{k \in \mathcal{N}} \alpha_k = \Sigma_{k \in \mathcal{P}} -\alpha_k \le 1, \alpha \mathcal{N} \ge 0, \alpha \mathcal{P} < 0\}$. The Smoothed Max-Margin loss and its gradient can again be computed using the largest few scores.

2. Loss Decomposition

According to aspects of the present disclosure, a loss can be decomposed into several parts. Recall the linear structural assumption (1): $f(x) = W\phi(x)$ for all $x \in \mathcal{X}$. In the description below, $(x, \mathcal{P})$ is fixed, and the dependence on $\mathcal{P}$ in L is dropped for convenience to simply use the notation $L(f(x))$ and $\nabla L(f(x))$ Because MIPS over the D-dimensional rows of W can be computationally expensive, W can instead be decomposed by exploiting the linear structure of f. Specifically, W can be decomposed by chunking the D coordinates of the vectors in $\mathbb{R}^D$ into B blocks, each of size D/B. Here $B \in \mathbb{N}$ is an integer and a larger B leads to easier MIPS problems but reduces accuracy of approximations produced. Let $W^{(1)}$, $W^{(2)}$, ..., $W^{(B)}$ be the corresponding block partitioning of W obtained by grouping together the columns corresponding to the coordinates in each block. Similarly, let $\phi^{(1)}(x)$, $\phi^{(2)}(x)$, ..., $\phi^{(B)}(x)$ be the conformal partitioning of the coordinates of $\phi(x)$.

If defining the overall score vector z: $= f(x) = W\phi(x)$, and per-chunk score vectors $z_j = W^{(j)}\phi^{(j)}(x)$, for $j \in [B]$, then $$z = \sum_{j=1}^{B} z_j,$$

which is a decomposition of the score vector. The following theorem states that the loss of a decomposable score vector can itself be decomposed into several parts connected through a set of message variables. This theorem is key to decoupling the variables into lower dimensional chunks that can be optimized separately via an efficient MIPS data structure. While this theorem can be derived by applying dual decomposition to the convex conjugate of the loss function, a simpler direct proof by construction is provided below.

Theorem 1 Let $L: \mathbb{R}^D \to \mathbb{R}$ be a convex function, and let $z \in \mathbb{R}^D$ be decomposed as a sum of B vectors as follows:

$$z = \sum_{j=1}^{B} z_j.$$

Then $L(z)$ is equal to the optimum value of the following convex minimization problem:

$$\min_{\lambda_j \in \mathbb{R}^D, j \in [B]} \frac{1}{B} \sum_{j=1}^{B} L(B(z_j + \lambda_j)) \text{ s.t.} \sum_{j=1}^{B} \lambda_j = 0. \quad (12)$$

Proof.

First, for any $\lambda_1, \lambda_2, \ldots, \lambda_B \in \mathbb{R}^D$ such that $$\sum_{j=1}^{B} \lambda_j = 0,$$

by Jensen's inequality applied to the convex function $$L: L(z) \le \frac{1}{B} \sum_{j=1}^{B} L(B(z_j + \lambda_j)).$$

On the other hand, if $$\lambda_j = \frac{1}{B} z - z_j$$

for all $j \in [B]$, then $$L(z) = \frac{1}{B} \sum_{j=1}^{B} L(B(z_j + \lambda_j)).$$

2.1 Loss Decomposition Guided Search (LDGS)

Theorem 1 is the basis for computing approximations to the loss and its gradient. This approximation is computed by approximately solving the convex minimization problem (12) without computing the whole score vector z, using a form of descent method on the $\lambda_j$ variables (e.g., "message passing"). The gradient computations required for each step can be (approximately) done using an efficient MIPS data structure storing the D/B dimensional rows of $W^{(j)}$. The details of the loss decomposition guided search are given in Algorithm 2.

Algorithm 2 Greedy Message Passing input A sample x, threshold parameters $\tau_1, \tau_2 > 0$, and access to B MIPS data structures $\mathcal{T}_j$ storing the rows of $W^{(j)}$, for $j \in [B]$ output Approximation to $L(f(x))$ and $\nabla L(f(x))$.

1: Query $\mathcal{T}_j$ with $\phi^{(j)}(x)$ and threshold $\tau$ to find $\mathcal{S}_j$ := $\{k | |[z_j]_k| > \tau_1\}$.

2: Construct a sparse approximation $\tilde{z}_j$ for $z_j$ by setting $[\tilde{z}_j]_k = [z_j]_k$ for $k \in \mathcal{S}_j \cup \mathcal{P}$, and $[\tilde{z}_j]_k = 0$ for $k \notin \mathcal{S}_j \cup \mathcal{P}$.

3: for t=1, 2, ... (until converged) do

4: Compute the set $$\mathcal{A} = \cup_{j \in [B]} \{k | |[\nabla L(B(\tilde{z}_j + \lambda_j))]_k| > \tau_2\}.$$

5: Compute $$[\lambda_j^*]_k = \frac{1}{B}[\tilde{z}]_k - [\tilde{z}_j]_k$$

for all $K \in \mathcal{A}$ and all $j \in [B]$.

6: Compute the step size $$\eta = \frac{2}{t+2}.$$

7: For all $k \in \mathcal{A}$ and all $j \in [B]$, update $$[\lambda_j]_k \leftarrow \eta[\lambda_j^*]_k + (1-\eta)[\lambda_j]_k.$$

8: end for
9: Return $$\frac{1}{B}\sum_{j=1}^{B} L(B(\tilde{z}_j + \lambda_j))) \text{ and } \frac{1}{B}\sum_{j=1}^{B} \nabla L(B(\tilde{z}_j + \lambda_j)).$$

A sublinear in K time implementation of step 5 in the algorithm relies on the fact that both $\tilde{z}_j$ and $\lambda_j$ are sparse vectors, which in turn relies on the fact that gradients of the loss functions of interest are either sparse or concentrated on a few coordinates. Step 9 in the algorithm moves the current solution towards the optimal solution $\lambda_j^*$ for which there is a closed form formula based on the constructive proof of Theorem 1. This movement is only done for the set of coordinates of the gradients of high magnitude identified in step 5 of the algorithm, thus ensuring that only a few coordinates are updated. In this way, the algorithm is performing a greedy descent towards the optimal solution.

2.2 Error Analysis

Define $$\tilde{z} = \sum_{j=1}^{B} \tilde{z}_j.$$

Note that $\|z - \tilde{z}\|_\infty \leq B\tau_1$, so the error in approximating $L(z)$ by $L(\tilde{z})$ is at most $B\tau_1$ times the $l_\infty$ Lipschitz constant of L, which is typically small as explained earlier. The algorithm essentially runs a Frank-Wolfe type method to converge to $L(\tilde{z})$. In the following, the convergence rate of the greedy message passing algorithm (Algorithm 2) to $L(\tilde{z})$ is analyzed. The analysis relies on smoothness of the loss function. A function is said to be $1/\mu$-smooth if its gradients are Lipschitz continuous with constant $1/\mu$. For the Cross-Entropy loss (2) $\mu=1$, and for the smoothed max-margin loss (10), $\mu$ is a tunable parameter. A setting of $\mu \in [1,5]$ was found to work well in experiments.

To analyze the algorithm, denote by $\Lambda$ the BK dimensional vector $<\lambda_1, \lambda_2, \ldots, \lambda_B>$ in any given step in the loop of the algorithm. Similarly let $\Lambda^*$ denote the BK dimensional vector composed of $\lambda_j^*$. Define $$G(\Lambda) = \frac{1}{B}\sum_{j=1}^{B} L(B(\tilde{z}_j + \lambda_j)),$$

i.e. the objective function in (12).

Theorem 2 (Greedy Message Passing)

Suppose the loss function L is $1/\mu$-smooth. Then the suboptimality gap of A in the t-th step of the loop can be bounded as follows:

$$G(\Lambda) - G(\Lambda^*) \leq \frac{2B\|\Lambda^*\|^2}{\mu(t+2)} + 2\tau_2 \ln(t)\|\Lambda^*\|_1$$

Proof.

Since the loss function L is $1/\mu$-smooth, it is easy to check that G is $B/\mu$-smooth. Thus, if $\Delta\Lambda$ is the change in $\Lambda$ in a given step of the loop in the algorithm, then $$G(\Lambda + \Delta\Lambda) - G(\Lambda) \leq \eta\langle\nabla G(\Lambda), \Delta\Lambda\rangle + \frac{\eta^2 B}{2\mu}\|\Delta\Lambda\|^2.$$

Note that $\Delta\Lambda$ equals $\Lambda^* - \Lambda$ in all coordinates except those corresponding to $k \notin \mathcal{A}$ for all $j \in [B]$, and the magnitude of the gradient in those coordinates is at most $\tau_2$. Thus $\langle\nabla G(\Lambda), \Delta\Lambda\rangle \leq \langle\nabla G(\Lambda), \Lambda^* - \Lambda\rangle + \tau_2\|\Lambda^*\|_1$, based on the fact that each coordinate of $\Lambda$ lies between 0 and the corresponding coordinate of $\Lambda^*$. Next, by the convexity of G, $\langle\nabla G(\Lambda), \lambda^* - \Lambda\rangle \leq G(\lambda^*) - G(\Lambda)$. Putting all the bounds together and following some algebraic manipulations:

$$G(\Lambda + \Delta\Lambda) - G(\Lambda^*) \leq \qquad (13)$$
$$(1-\eta)(G(\Lambda) - G(\Lambda^*)) + \eta\tau_2\|\Lambda^*\|_1 + \frac{\eta^2 B}{2\mu}\|\Lambda^*\|^2.$$

Here, the fact that each coordinate of $\Lambda$ lies between 0 and the corresponding coordinate of $\Lambda^*$ can be used to get the bound $\|\Delta\Lambda\|^2 \leq \|\Lambda^*\|^2$. Using the fact that $$\eta = \frac{2}{t+2}$$

in iteration t, a simple induction on t implies the claimed bound on $G(\Lambda) - G(\Lambda^*)$. Thus, to ensure that the suboptimality gap is at most $\varepsilon$, it suffices to run the greedy procedure for $$T = \frac{B\|\Lambda^*\|^2}{4\mu\varepsilon}$$

steps with $$\tau_2 = \frac{\varepsilon}{4\ln(T)\|\Lambda^*\|_1}.$$

While this theorem provides a proof of convergence for the algorithm to any desired error level, the bound it provides is quite weak. In practice, running just one step of the loop suffices to improve performance over direct search-based methods. If in addition to being smooth, the loss function is also strongly convex (which can be achieved by adding some $l_2^2$ regularization, for instance) then convergence of the gradients can also be shown. This is because for strongly convex functions the convergence of gradients can be bounded by in terms of the convergence of the loss value.

Cost Analysis.

Exact gradient evaluation for a single sample can be computed in O(DK) time. Directly applying a search-based gradient approximation (Algorithm 1) has a cost of $O(DQ_D(K))$, where $Q_D(K)$ is the number of classes retrieved in the MIPS data structure in order to find all classes of significant gradients. The query cost $Q_D(K)$ has a strong dependency on the dimension D. Exact MIPS has a cost $Q_D(K)$ exponential in D. For approximate search methods, such as Locality Sensitive Hashing (LSH), the cost $Q_D(K)$ typically only implicitly depends on the dimension. The method in Algorithm 2 divides D into B subproblems of dimension D/B with a cost per message passing iteration of $O(DQ_{D/B}(K) + DB|\mathcal{A}|)$, where $\mathcal{A}$ is the set computed in step 4 of Algorithm 2. Note $Q_{D/B}(K)$ decreases with B rapidly (exponentially in the exact case) and therefore one can select B such that $Q_{D/B}(K) \ll Q_D(K)$ and balance two terms s.t. $(DQ_{D/B}(K) + DB|\mathcal{A}|) \ll DK$.

3. Practical Considerations

MIPS Queries.

In practice when using the MIPS data structures, instead of retrieving all classes with scores more than the threshold $\tau_1$, it is more efficient to retrieve the top Q classes with the highest scores. In some implementations, Spherical Clustering can be used as the MIPS data structure, where the number of clusters C is selected such that $K/C \leq Q$ and $C \leq Q$. Note this requires $Q \geq \sqrt{K}$, leading to a speedup bounded by $\sqrt{K}$. Similarly, for computing the active set $\mathcal{A}$ in step 4 of Algorithm 2, an appropriate threshold $\tau_2$ can be computed using the properties of the loss function. In the case of margin-based losses, (3) and (7), and their smoothed versions (10), the gradient is sparse so $\tau_2$ can be set to 0 or some very small value. Loss functions like (2), (6) typically have exponentially decayed gradient magnitudes over the non-confusing negative classes. For these losses, classes can be retrieved in decreasing order of gradient magnitude, using a lower bound on the partition function $Z = \Sigma_k \exp(z_k)$ summing over only the subset of retrieved classes in order to decide whether more classes need to be retrieved or not.

Updates of Data Structures.

During training the model parameters determining f will change, and the data structures $\mathcal{T}_j$ need to be updated. These data structures store rows of W and treats $\phi(x)$ as query. For loss functions with a sparse gradient, such as (3), (7), and their smoothed versions (10), the number of updated rows of W, $k_r$, is much smaller than K and Q (the number of classes retrieved for a query). Thus the cost for re-indexing rows of W is $k_rC(D/B)B = k_rCD$, where C is the number of inner products required to index each row, which is much smaller than the costs of query and updates. For tasks with large number of updated rows ($k_r \approx Q$), the method is still effective with a larger mini-batch size $N_b$. As the costs of query and updates grow with $N_b$ while the number of rows to re-index is bounded by K, the cost of maintaining data structure becomes insignificant.

Sampling for Initialization.

For a randomly initialized model, the early iterates of learning have gradients evenly distributed over the classes, as the scores of all classes are close to each other. Therefore, it is unnecessary to search candidates of significant gradient magnitude in the early stage. In practice, one can switch from a sampling-based gradient approximation to a search-based gradient approximation after a number of mini-batch updates.

The systems and methods described herein provide a number of technical effects and benefits. Systems and methods for enabling a technique to reduce a high dimensional search problem to several lower dimensional search problems can have a technical effect of improved efficiency by lowering a computational cost associated with the high dimensional search problem. For example, the high dimensional search problem can be solved by one or more processors in fewer cycles with a smaller memory requirement and/or the lower dimensional search problems can be distributed across several processors and solved in parallel thereby reducing a computational time associated with the high-dimensional search problem. Recently developed methods of using efficient data structures for Nearest-Neighbor Search (NNS) or Maximum Inner Product Search (MIPS) speed up learning, but the performance of such data structures degrades in high dimensions. The technique of the present disclosure improves the accuracy of search-based gradient approximation methods and outperforms sampling-based gradient approximation methods.

Additionally, systems and methods for enabling a greedy message passing technique can have a technical effect of guaranteeing convergence of an approximated loss to an original loss. The technique can enable decoupling variables into lower dimensional chunks that can be optimized separately and iteratively performing a greedy descent toward an optimal solution.

The systems and methods of the present disclosure also provide an improvement to computing technology, such as data matching and retrieval computing technology. For instance, the systems and methods herein enables the evaluation of a loss or a gradient of the loss to be carried out efficiently.

EXAMPLE EMBODIMENTS

With reference now to the FIGS., example embodiments of the present disclosure will be discussed in further detail.

FIG. 1 depicts a block diagram of an example computing system 100 that can evaluate a loss function and/or a gradient of a loss function according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

More particularly, the machine-learned models 120 can be associated with large output spaces, such as, for example, extreme multiclass or multilabel classification problems with many classes, language modeling with big vocabularies, and/or metric learning with a large number of pairwise distance constraints. In some implementations, the machine-learned models 120 can be associated with a class of scoring functions $\mathcal{F}$, such that there is an embedding dimension parameter $D \in \mathbf{N}$ for every $f \in \mathcal{F}$, an associated weight matrix $W \in \mathbb{R}^{K \times D}$ and a feature map $\phi: \mathcal{X} \to \mathbb{R}^D$ so that for all $x \in \mathcal{X}$, $f(x) = W\phi(x)$.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., an extreme multiclass or multilabel classification service, a language modeling service, a metric learning service, etc.). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned recurrent super-resolution models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-7.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, evaluating a loss function and/or a gradient of a loss function associated with the machine-learned models 120 and/or 140, and backwards propagation of errors. In some implementations, performing backwards propagation of errors can include performing truncated back propagation through time. The model trainer 160 can perform a number of generalization techniques (e.g., weight decays, dropouts, etc.) to improve the generalization capability of the models being trained.

More particularly, the model trainer 160 can apply dual decomposition to a convex-conjugate representation of a loss function. The machine trainer 160 can apply dual decomposition in addition to applying search data structures (e.g., a MIPS data structure) to a learning problem. The model trainer 160 can replace a high dimensional search problem with several lower dimensional searches by decoupling the dimensions via dual decomposition. The model trainer 160 can couple the different lower dimensional searches via a greedy message passing that can guarantee convergence to obtain good approximations to a loss and its gradient.

In some implementations, the model trainer 160 can partition a weight matrix that corresponds to a scoring function associated with the machine-learned models 120 and/or 140. The model trainer 160 can partition the weight matrix into a plurality of blocks, and store the plurality of blocks in a plurality of corresponding MIPS data structures. For example, the model trainer 160 can store the rows of each of the plurality of blocks in the MIPS data structure corresponding to the block. The model trainer 160 can query each of the plurality of MIPS data structures with a first threshold value to identify a first set of labels that are associated with a score greater than the first threshold value. The model trainer 160 can construct a sparse approximation of a scoring vector for each of the plurality of blocks based at least in part on the first set of labels, determine a correction value for each sparse approximation. The model trainer 160 can iteratively optimize a decomposed loss function by updating a correction value for at least some of the first set of labels. After optimizing the decomposed loss function, the model trainer 160 can evaluate the decomposed loss function or a gradient of the decomposed loss function based at least in part on the sparse approximation of the scoring vector for each of the plurality of blocks and the correction value associated with the sparse approximation of the scoring vector. In this way, the model trainer 160 can determine an approximation of a loss or a gradient of a loss associated with the scoring function.

The model trainer 160 can train the machine-learned models 120 and/or 140 based on a set of training data 162. The training data 162 can include, for example, labeled sample pairs (x, $\mathcal{P}$) with x∈$\mathcal{X}$ and $\mathcal{P} \subseteq \mathcal{Y}$, where $\mathcal{X}$ denotes the input space, $\mathcal{Y}$ denotes the output space, and $\mathcal{P}$ denotes the set of correct labels for the input point x.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 2:
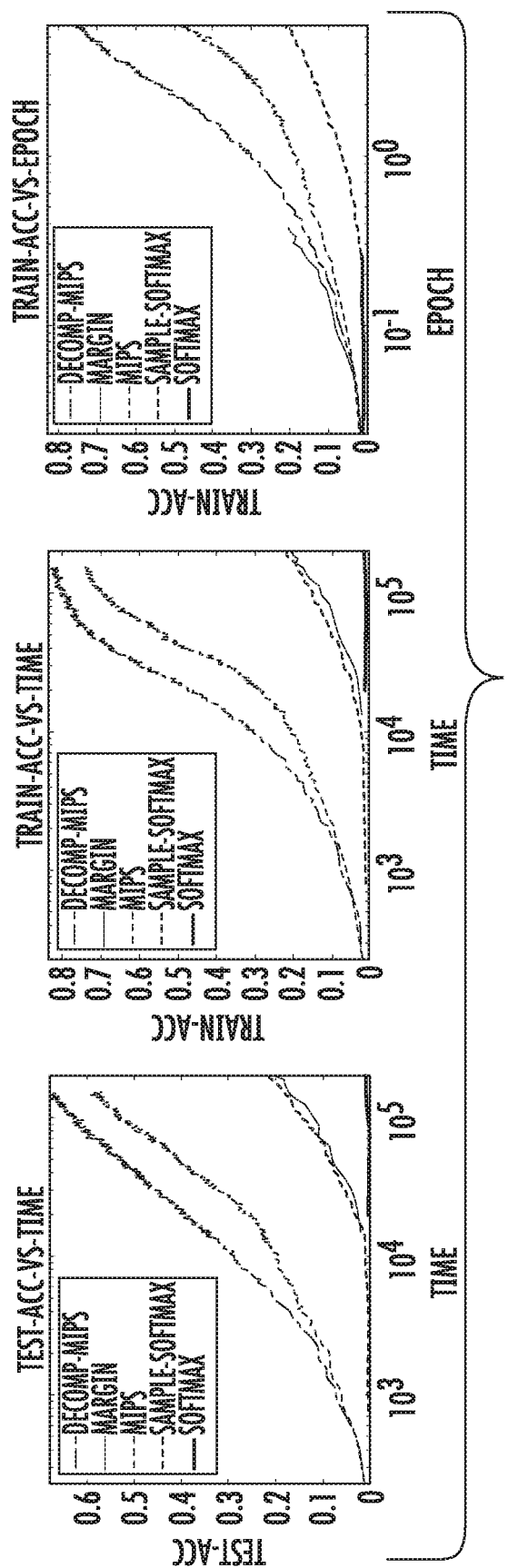
FIG. 2 depicts plot diagrams of multiclass classification results on the Megaface dataset, in accordance with some implementations of the present disclosure.

FIG. 2 depicts plot diagrams of multiclass classification results on the Megaface dataset, in accordance with some implementations of the present disclosure.

Figure 3:
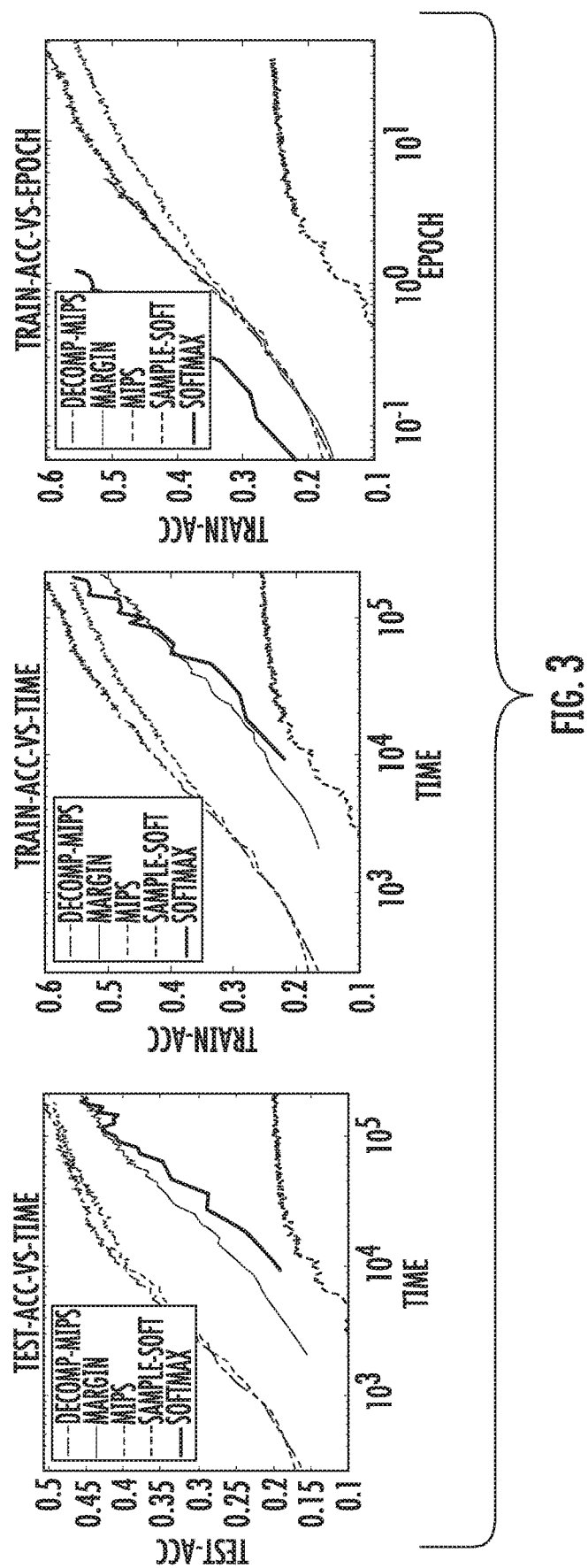
FIG. 3 depicts plot diagrams of multilabel classification results on the WikiLSHTC dataset, in accordance with some implementations of the present disclosure.

FIG. 3 depicts plot diagrams of multilabel classification results on the WikiLSHTC dataset, in accordance with some implementations of the present disclosure.

Figure 4:
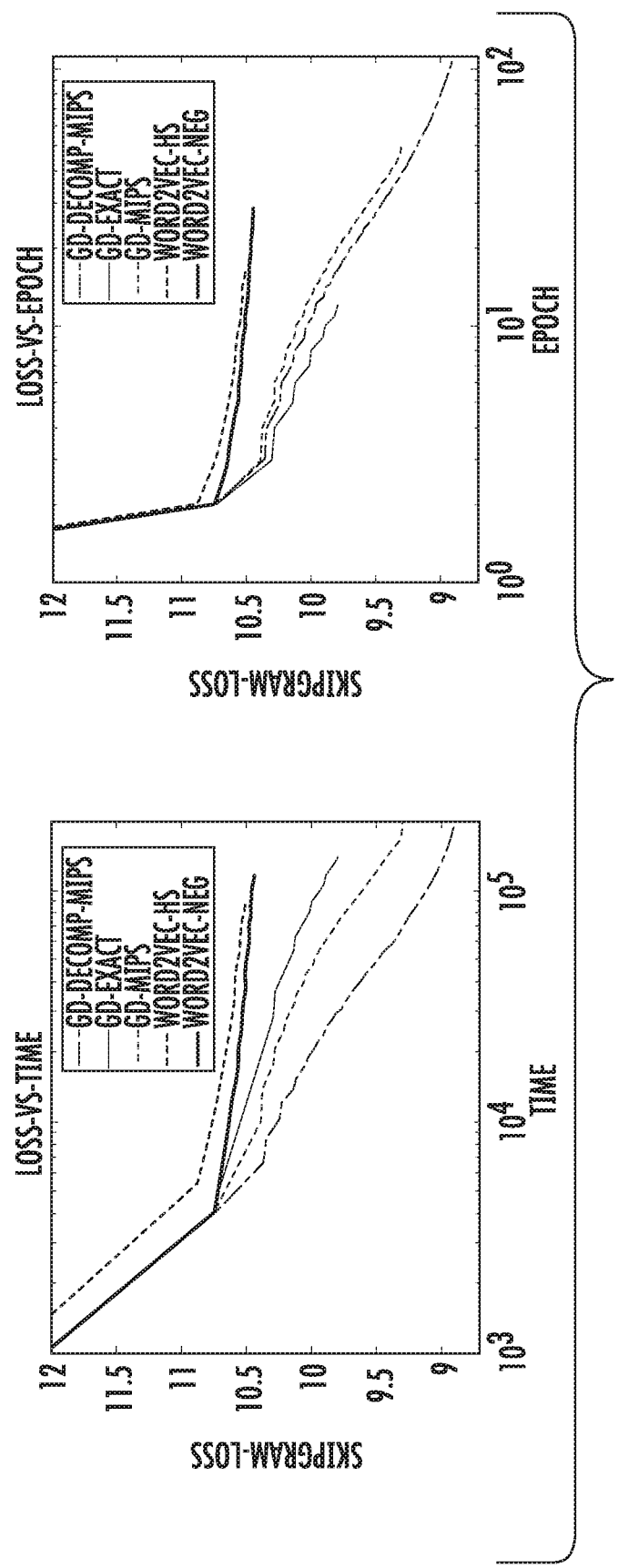
FIG. 4 depicts plot diagrams of results on word embedding with Skip-gram objective, in accordance with some implementations of the present disclosure.

FIG. 4 depicts plot diagrams of results on word embedding with Skip-gram objective, in accordance with some implementations of the present disclosure.

Thus, FIGS. 2-4 depict plot diagrams that illustrate a comparison of different loss functions and gradient evaluation methods according to example embodiments of the present disclosure. In particular, FIG. 2 corresponds to a multiclass classification problem (e.g., face recognition) and depicts plot diagrams illustrating results of multiclass classification on the MegaFace dataset: Test Accuracy vs. Training Time (left), Training Accuracy vs. Training Time (middle), and Training Accuracy vs. Number of Epochs (right), where the x-axis is in log-scale. FIG. 3 corresponds to a multilabel classification problem (e.g., document tagging) and depicts plot diagrams illustrating results of multilabel classification on the WikiLSHTC dataset: Test Accuracy vs. Training Time (left), Training Accuracy vs. Training Time (middle), and Training Accuracy vs. Number of Epochs (right), where the x-axis is in log-scale. FIG. 4 corresponds to an Unsupervised Word Embedding problem and depicts plot diagrams illustrating results on word embedding with Skip-gram objective (9), where GD-Exact, GD-MIPS, and GD-Decomp-MIPS are initialized with a model trained by one epoch of Word2vec-Neg.

With respect to FIGS. 2 and 3, a Stochastic Gradient Descent (SGD) optimization algorithm is employed, with an initial step size chosen from {1, 0.1, 0.01} for the best performance of each method, with a 1/(1+t) cooling scheme where t is the iteration counter. The mini-batch size is 10 and all methods are parallelized with 10 CPU cores in a shared-memory architecture, running on a dedicated machine. All the implementations are in C++. The following loss functions and gradient evaluation methods are compared:

Softmax: exact gradient evaluation of the cross-entropy loss (2), with $|\mathcal{P}|=1$ for multiclass in FIG. 2, and $|\mathcal{P}|\ll K$ for multilabel in FIG. 3;

Sampled-Softmax: sampling strategy which includes all positive classes of the instances and uniformly subsamples from the remaining negative classes with a sample size as K/100;

Margin: exact gradient evaluation of the smoothed max-margin loss (10), with μ=1 for multiclass in FIG. 2, and μ=5 for multilabel in FIG. 3. The bi-simplex projection (11) is computed in O(Klog(K)). For this loss, the gradient update is faster than that for cross-entropy, as the loss gradient is very sparse, making the backward pass much faster;

MIPS: search-based gradient evaluation (e.g., Algorithm 1) of the smoothed max-margin loss (10), with μ=1 for multiclass in FIG. 2, and μ=5 for multilabel in FIG. 3. A Spherical Clustering with 100 centroids is used as the MIPS data structure with a batch query of size K/100; and Decomp-MIPS: gradient evaluation via decomposed search (e.g., Algorithm 2, T=1 iteration). The inner product is divided into B=8 factors for multiclass in FIG. 2, and B=4 for multilabel in FIG. 3. A Spherical Clustering with 100 centroids is used as the MIPS data structure with a batch query of size K/100.

For FIG. 2, the multiclass classification experiments are conducted on the largest publicly available facial recognition dataset MegaFace, where each identity is considered a class, and each sample is an image cropped by a face detector. The MegaFace dataset statistics are shown in Table 1. The FaceNet architecture is pre-trained on the MS-Celeb-1M dataset, and its last layer is fine-tuned on the MegaFace dataset. The input of the last layer is an embedding of size 128, which is divided into B=8 factors, each of dimension 16, in the Decomp-MIPS method.

TABLE 1

Statistics of the MegaFace dataset

| #Identities | #Images | Embedding Dimension |
|---|---|---|
| 672K | 4.7M | 128 |

The compared methods in FIG. 2 are run for more than one day and the result is shown in FIG. 2. Comparing methods that optimize the (smoothed) max-margin loss (Decomp-MIPS, MIPS and Margin) shows that both Decomp-MIPS and MIPS speed up the iterates by 1~2 orders of magnitude. However, MIPS converges at an accuracy much lower than Decomp-MIPS and the gap gets bigger when running for more iterations. Note the time and epochs are in log scale. Additionally, Softmax has a much slower progress compared to Margin. Neither Softmax nor Margin finish one epoch (4.7M samples) after one day. The progress of Margin is much better, presumably because its focus on the confusing identities. Furthermore, Sampled-Softmax has much faster iterates, but the progress per iterate is small, leading to slower overall progress compared to the MIPS-based approaches.

For FIG. 3, the multilabel classification experiments are conducted on WikiLSHTC, a benchmark dataset in the Extreme Classification Repository, where each class is a catalog tag in the Wikipedia, and each sample is a document with bag of words representation. The WikiLSHTC data statistics are shown in Table 2. On average, each sample has 3.19 positive labels, and each class appears in 17.46 samples as a positive class. A one-hidden-layer fully-connected feed-forward network is trained for the multilabel classification task. The first layer has input dimension equal to the vocabulary size (1.6M) and an output of dimension 100. The second layer has output size equal to the number of classes (325K), with different loss functions and approximations for different methods in comparison. The training result also produces document and work embedding as by-products. For Decomp-MIPS, the input of the last layer is divided into B=4 factors, each of dimension 25.

The compared methods in FIG. 3 are run for more than one day and the result is shown in FIG. 3. As shown, Softmax has very good per-iteration progress, significantly more than that from the other three approaches based on the smoothed max-margin loss (Margin, MIPS, Decomp-MIPS). However, the iterates of Softmax are much slower than the others as it has a dense loss gradient and thus a slower backpropagation, so that when comparing training time, Softmax performs similarly to Margin. On the other hand, when comparing Margin Decomp-MIPS, and MIPS in progress per epoch, the updates of Decomp-MIPS achieve almost the same progress as the exact gradient calculation of Margin, while MIPS has a significant drop in its training accuracy compared with Margin and Decomp-MIPS, since it runs for more iterations. Overall, the MIPS-based methods lead to an order of magnitude speedup, while Decomp-MIPS retains the accuracy of the exact method. On the other hand, Sampled-Softmax has an extremely slow per-iteration progress despite its fast iterates, and could not reach a comparable accuracy to other methods even after one day.

TABLE 2

Statistics of the WikiLSHTC dataset

| #Label | #Sample | Embedding Dimension | Vocabulary Size |
|---|---|---|---|
| 325K | 1.8M | 100 | 1.6M |

With respect to FIG. 4, the gradient approximation methods of the present disclosure are evaluated on the word embedding task with the Skip-gram learning objective (9) and compared with two widely-used gradient approximation methods—Hierarchical Softmax (Word2vec-HS) and Negative Sampling (Word2vec-Neg) implemented in the word2vec package. The sample size for Word2vec-Neg is selected from {5, 10, 15, 20, 25}.

The benchmark dataset BillonW is used which consists of almost a half million vocabulary size. The data statistics are provided in Table 3. A window of size 8 is used and frequent words are subsampled in the corpus. Each word w is dropped with probability $$\max\left\{1 - \sqrt{\frac{t}{f_w}}, 0\right\}$$

where $f_w$ is the relative frequency of the word in the corpus, and $t=10^{-4}$ is a threshold parameter.

TABLE 3

Statistics of the BillionW dataset

| Vocab. Size | #Words | Embedding Dimension | Window Size |
|---|---|---|---|
| ≈ 451K | ≈ 680M | 100 | 8 |

Note that the Skip-gram objective (9) is presented in a collapsed form. Here, all terms of the same input-output pairs are grouped together and weighted by the frequency. The gradients are computed from the positive outputs by summing over the empirical input-output distribution $q_x$, $q_{y|x}$ in (9). Then gradient descent (GD) updates are performed on the parameters of input words $\{\phi(x)\}_{x \in \mathcal{X}}$ and output words $\{\phi(y)\}_{y \in \mathcal{X}}$ alternately. GD, GD-MIPS and GD-Decomp-MIPS are used to denote the algorithm with different strategies of loss approximations. Since in the early iterates the model has quite evenly distributed gradient over candidates, 1 epoch of Word2vec-Neg is used to initialize GD, GD-MIPS and GD-Decomp-MIPS. For this task, there are many more negative classes of significant gradient magnitude than in the multilabel and multiclass experiments. A batch query of size K/20 is used instead of K/100 to the MIPS structure.

The compared methods in FIG. 4 are parallelized with 24 CPU cores and the results are shown in FIG. 4. After the first epoch, methods based on alternating gradient descent (GD) (with the collapsed objective (9)) have faster convergence per epoch, and the iterations of GD-Deomp-MIPS are 5 times faster than those of GD while having a significantly better objective value than GD-MIPS for the same training time.

Figure 5:
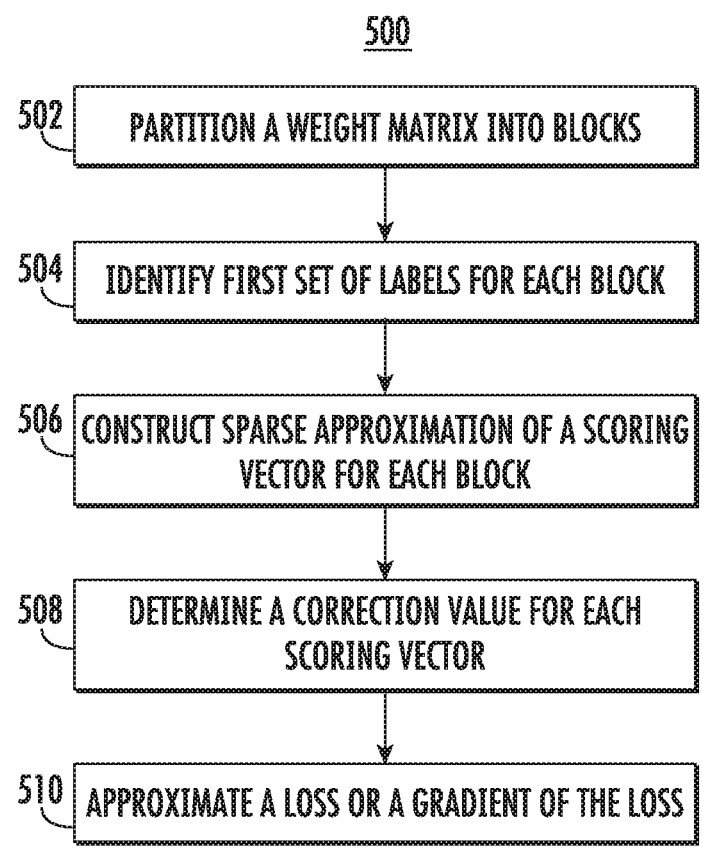
FIG. 5 depicts a flow diagram of an example method for evaluating a loss function or a gradient of the loss function, in accordance with some implementations of the present disclosure.

FIG. 5 depicts a diagram of a method 500 for evaluating a loss function or a gradient of the loss function. At (502), the method 500 includes partitioning a weight matrix into blocks. For example, the training computing system 150 can partition a weight matrix that corresponds to a scoring function. The training computing system 150 can partition the weight matrix into a plurality of blocks. Each of the plurality of blocks can include one or more columns of the weight matrix.

At (504), the method 500 includes identifying a first set of labels for each block. For example, the training computing system 150 can identify a first set of labels for each of the plurality of blocks. The first set of labels can be associated with a score greater than a first threshold value. The training computing system 150 can query each of a plurality of maximum inner product search data structures that are respectively associated with the plurality of blocks of the weight matrix. In particular, the training computing system 150 can obtain a feature map corresponding to the weight matrix and the scoring function, partition the feature map into a plurality of blocks corresponding to the plurality of blocks of the weight matrix, and query each of the plurality of maximum inner product search data structures that are respectively associated with the plurality of blocks of the weight matrix with an output of the partitioned feature map corresponding to the block of the weight matrix and the first threshold value.

At (506), the method 500 includes constructing a sparse approximation of a scoring vector for each block. For example, the training computing system 150 can construct a sparse approximation of a scoring vector for each of the plurality of blocks based at least in part on the first set of labels. The training computing system 150 can set, for each of the plurality of blocks, a respective approximate score for each of the plurality of labels that was neither included in the first set of labels for the block nor a positive label equal to zero; and set, for each of the plurality of blocks, a respective approximate score for each of the plurality of labels that was that was neither included in the first set of labels for the block nor a positive label equal to a true score determined according to a maximum inner search product search query.

At (508), the method 500 includes determining a correction value for each scoring vector. For example, the training computing system 150 can determine a correction value for each sparse approximation of the scoring vector for each of the plurality of blocks. In particular, the training computing system 150 can identify a second set of labels based at least in part on the first set of labels for each of the plurality of blocks, the second set of labels being associated with a gradient greater than a second threshold value. The training computing system 150 can determine an average approximate score for each label in the second set of labels across the plurality of blocks. The training computing system 150 can determine an approximate score for each label in the second set of labels for each of the plurality of blocks. The training computing system 150 can determine a difference between the average approximate score and the approximate score for each of the plurality of blocks for each combination of a label in the second set of labels and a block in the plurality of blocks. The training computing system 150 can update the correction value for each sparse approximation of the scoring vector for each of the plurality of blocks based at least in part on the determined difference for each combination of a label in the second set of labels and a block in the plurality of blocks.

At (510), the method 500 includes approximating a loss or a gradient of the loss. For example, the training computing system 150 can determine an approximation of a loss or a gradient of a loss associated with the scoring function by evaluating a decomposed loss function or a gradient of the decomposed loss function based at least in part on the sparse approximation of the scoring vector for each of the plurality of blocks and the correction value associated with the sparse approximation of the scoring vector. The decomposed loss function can include a plurality of parts, each part corresponding to loss associated with a respective sparse approximation of the scoring vector for each of the plurality of blocks.

The training computing system 150 can perform a smoothing technique on a loss function to construct a surrogate loss function that has continuous gradients, and determine the decomposed loss function based at least in part on the surrogate loss function.

The training computing system 150 can minimize an average, across the plurality of blocks, of a respective loss for each block evaluated at the respective approximated scoring vector for such block plus a correction value vector for each block such that a sum of the correction value vectors across the plurality of blocks is equal to zero.

The training computing system 150 can determine the approximation of the loss or the gradient of the loss for each of a plurality of training examples.

The training computing system 150 can modify one or more parameters of the weight matrix or the scoring function based at least in part on the determined approximation of the loss or the gradient of the loss associated with the scoring function.

The method 500 may be used when training a classifier. The classifier may be used for in extreme multiclass or multilabel classification problems. The classifier may provide classification of any suitable data items and may, for example be for classifying or finding an audio segment, image, or video, e.g. based upon an input sequence which may represent one or more images or videos. The data items may be data representing a still or moving image, in which case individual numerical values contained in the data item may represent pixel values, for example values of one or more color channels of the pixels. The training images used for training the model may be images of the real world, captured by a camera.

Alternatively the data item may be data representing a sound signal, for example amplitude values of an audio waveform (e.g. a natural language; the training examples in this case may be samples of natural language, e.g. recorded by a microphone from speech by human speakers). In another possibility, the data item may be text data, for example a text string or other representation of words and/or sub-word units (wordpieces) in a machine translation task. Thus the data item may be one, two, or higher-dimensional.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for evaluating a loss function or a gradient of the loss function, the method comprising:
    partitioning, by a computing system that includes one or more computing devices, a weight matrix into a plurality of blocks, the weight matrix corresponding to a scoring function;
    identifying, by the computing system, a first set of labels for each of the plurality of blocks, the first set of labels being associated with a score greater than a first threshold;
    constructing, by the computing system, a sparse approximation of a scoring vector for each of the plurality of blocks based at least in part on the first set of labels;
    determining, by the computing system, a correction value for each sparse approximation of the scoring vector for each of the plurality of blocks; and
    determining, by the computing system, an approximation of a loss or a gradient of a loss associated with the scoring function by evaluating a decomposed loss function or a gradient of the decomposed loss function based at least in part on the sparse approximation of the scoring vector for each of the plurality of blocks and the correction value associated with the sparse approximation of the scoring vector.

2. The computer-implemented method of claim 1, further comprising:
    determining, by the computing system, the approximation of the loss or the gradient of the loss for each of a plurality of training examples.

3. The computer-implemented method of claim 1, further comprising:
    modifying, by the computing system, one or more parameters of the weight matrix or the scoring function based at least in part on the determined approximation of the loss or the gradient of the loss associated with the scoring function.

4. The computer-implemented method of claim 1, wherein identifying the first set of labels for each of the plurality of blocks comprises:
    querying, by the computing system, each of a plurality of maximum inner product search data structures that are respectively associated with the plurality of blocks of the weight matrix.

5. The computer-implemented method of claim 1, wherein constructing the sparse approximation of the scoring vector for each of the plurality of blocks comprises:
    setting for each of the plurality of blocks, by the computing system, a respective approximate score for each of a plurality of labels that was neither included in the first set of labels for the block nor a positive label equal to zero.

6. The computer-implemented method of claim 1, wherein constructing the sparse approximation of the scoring vector for each of the plurality of blocks comprises:
    setting for each of the plurality of blocks, by the computing system, a respective approximate score for each of a plurality of labels that was neither included in the first set of labels for the block nor a positive label equal to a true score determined according to a maximum inner product search query.

7. The computer-implemented method of claim 1, wherein determining the correction value for each sparse approximation of the scoring vector for each of the plurality of blocks comprises:
    identifying, by the computing system, a second set of labels based at least in part on the first set of labels for each of the plurality of blocks, the second set of labels being associated with a gradient greater than a second threshold;
    determining, by the computing system, an average approximate score for each label in the second set of labels across the plurality of blocks;
    determining, by the computing system, an approximate score for each label in the second set of labels for each of the plurality of blocks;
    determining, by the computing system, a difference between the average approximate score and the approximate score for each of the plurality of blocks for each combination of a label in the second set of labels and a block in the plurality of blocks; and
    updating, by the computing system, the correction value for each sparse approximation of the scoring vector for each of the plurality of blocks based at least in part on the determined difference for each combination of a label in the second set of labels and a block in the plurality of blocks.

8. The computer-implemented method of claim 1, wherein determining an approximation of a loss or a gradient of a loss associated with the scoring function comprises:
    minimizing an average, by the computing system, across the plurality of blocks, of a respective loss for each block evaluated at the respective approximated scoring vector for such block plus a correction value vector for each block such that a sum of the correction value vectors across the plurality of blocks is equal to zero.

9. The computer-implemented method of claim 1, wherein the decomposed loss function comprises a plurality of parts, each part corresponding to loss associated with a respective sparse approximation of the scoring vector for each of the plurality of blocks.

10. The computer-implemented method of claim 1, further comprising:
    performing, by the computing system, a smoothing technique on a loss function to construct a surrogate loss function that has continuous gradients; and
    determining, by the computing system, the decomposed loss function based at least in part on the surrogate loss function.

11. The computer-implemented method of claim 1, wherein each of the plurality of blocks comprises one or more columns of the weight matrix.

12. The computer-implemented method of claim 4, wherein querying each of the plurality of maximum inner product search data structures that are respectively associated with the plurality of blocks of the weight matrix comprises:
    obtaining, by the computing system, a feature map corresponding to the weight matrix and the scoring function;
    partitioning, by the computing system, the feature map into a plurality of blocks corresponding to the plurality of blocks of the weight matrix; and
    querying, by the computing system, each of the plurality of maximum inner product search data structures that are respectively associated with the plurality of blocks of the weight matrix with an output of the partitioned feature map corresponding to the block of the weight matrix and the first threshold.

13. A computing system, comprising:
one or more processors; and
one or more non-transitory computer-readable media that store instructions that, when executed by the one or more processors cause the computing system to perform operations, the operations comprising:
identifying, for each of a plurality of block partitions of a weight matrix, a first subset of a plurality of labels, wherein each label in the first subset has a score greater than a first threshold value;
constructing, for each of the plurality of block partitions, a sparse approximation of a scoring vector for such block partition based at least in part on the first subset of the plurality of labels identified for such block partition;
iteratively optimizing a decomposed loss function by updating, at each of one or more iterations, a correction value for at least some of the plurality of labels; and
after iteratively optimizing the decomposed loss function, returning an evaluation of the decomposed loss function or a gradient of the decomposed loss function.

14. The computing system of claim 13, the operations further comprising:
performing said operations of identifying, constructing, iteratively optimizing, and returning for each of a plurality of training examples.

15. The computing system of claim 13, the operations further comprising:
modifying one or more parameters of the weight matrix or a machine-learned scoring model approximated by the weight matrix based at least in part on the evaluation of the decomposed loss function or the gradient of the decomposed loss function.

16. The computing system of claim 13, wherein identifying, for each of the plurality of block partitions of the weight matrix, the first subset of the plurality of labels comprises:
querying each of a plurality of maximum inner product search data structures that are respectively associated with the plurality of block partitions of the weight matrix.

17. The computing system of claim 13, wherein constructing, for each of the plurality of block partition, the sparse approximation of the scoring vector for such block partition comprises:
for each of the plurality of block partitions, setting a respective approximate score for each of the plurality of labels that was neither included in the first subset for such block partition nor a positive label equal to zero.

18. The computing system of claim 13, wherein constructing, for each of the plurality of block partitions, the sparse approximation of the scoring vector for such block partition comprises:
For each of the plurality of block partitions, setting a respective approximate score for each of the plurality of labels that was neither included in the first subset for such block partition nor a positive label equal to a true score determined according to a maximum inner product search query.

19. The computing system of claim 13, wherein iteratively optimizing the decomposed loss function comprises:
for each of the one or more iterations:
identifying a second subset of the plurality of labels for which a respective subgradient is greater than a second threshold;
determining, for each combination of a label included in the second subset and block partition, a difference between an average of the approximated scores for such label across the plurality of block partitions and the approximated score for such label for such block partition; and
updating, for each combination of label included in the second subset and block partition, a respective correction value for such combination of label and block partition based at least in part on the difference between the approximated scores for such label across the plurality of block partitions and the approximated score for such label for such block partition.

20. The computing system of claim 13, wherein iteratively optimizing the decomposed loss function comprises:
minimizing an average, across the plurality of block partitions, of a respective loss for each block partition evaluated at the respective approximated scoring vector for such block partition plus a correction value vector for each block partition such that a sum of the correction value vectors across the plurality of block partitions is equal to zero.

* * * * *